US010710894B1

(12) United States Patent
Geng et al.

(10) Patent No.: US 10,710,894 B1
(45) Date of Patent: Jul. 14, 2020

(54) METHOD FOR PREPARING HOLLOW OCTAHEDRAL CUPROUS OXIDE

(71) Applicant: Northwestern Polytechnical University, Xi'an (CN)

(72) Inventors: Wangchang Geng, Xi'an (CN); Yejun Zhao, Xi'an (CN); Xiaowei He, Xi'an (CN); Libing Duan, Xi'an (CN); Qiuyu Zhang, Xi'an (CN)

(73) Assignee: NORTHWESTERN POLYTECHNICAL UNIVERSITY, Xi'an (CN)

( * ) Notice: Subject to any disclaimer, the term of this patent is extended or adjusted under 35 U.S.C. 154(b) by 0 days.

(21) Appl. No.: 16/745,086

(22) Filed: Jan. 16, 2020

(30) Foreign Application Priority Data

Jan. 23, 2019 (CN) .......................... 2019 1 0062635

(51) Int. Cl.
*C01G 3/02* (2006.01)
(52) U.S. Cl.
CPC ............ *C01G 3/02* (2013.01); *C01P 2002/72* (2013.01); *C01P 2004/03* (2013.01)
(58) Field of Classification Search
CPC ....................................................... C01G 3/02
See application file for complete search history.

(56) References Cited

U.S. PATENT DOCUMENTS

2019/0202762 A1* 7/2019 Wu ........................ B01J 37/031

FOREIGN PATENT DOCUMENTS

CN    106698498 A    5/2017

OTHER PUBLICATIONS

Ji Chan Park, Jeonghan Kim, Hyuksang Kwon, and Hyunjoon Song, "Gram Scale Synthesis of Cu2) Nanocubes and Subsequent Oxidation to Cu) hollow Nanostructures for Lithium-Ion Battery Anode Materials," Advanced Materials, 2009, 21, 803-807.
First Office Action issued by CNIPA for CN201910062635.7.
Search Report issued by CNIPA for CN201910062635.7.

* cited by examiner

*Primary Examiner* — James A Fiorito
(74) *Attorney, Agent, or Firm* — Flener IP & Business Law; Zareefa B. Flener

(57) ABSTRACT

The present invention provides a method for preparing a hollow octahedral cuprous oxide, which includes the following steps: (1) mixing a copper chloride solution and a sodium hydroxide solution, and then performing a precipitation reaction to obtain a precipitation solution; and (2) mixing the precipitation solution with glucose and ammonium hydroxide, and then reacting to generate the hollow octahedral cuprous oxide. In the present invention, firstly sodium hydroxide and copper chloride are reacted to generate a copper hydroxide precipitate; then glucose is used to reduce copper ions, and ammonium hydroxide is used to produce graded diffusion dissolution action on octahedral particles, such that the octahedral particles are gradually dissolved into hollow structures. It can be seen from the results of the examples that, the method provided by the present invention can prepare hollow octahedral cuprous oxide with an uniform and pure structure.

4 Claims, 2 Drawing Sheets

METHOD FOR PREPARING HOLLOW OCTAHEDRAL CUPROUS OXIDE

TECHNICAL FIELD

The present invention relates to the technical field of preparation of micro-nano materials, and in particular to a method for preparing a hollow octahedral cuprous oxide.

BACKGROUD

Cuprous oxide is a typical P-type semiconductor with a forbidden band width of 2-2.2 eV, which has good photoelectric properties and is applied in various fields. For example, a cuprous oxide nanowire is utilized as a photocathode to produce hydrogen by splitting water; and a cuprous oxide pentacontahedron is used as an oxidation catalyst for catalyzed hydrogen production with carbon monoxide.

In recent years, a hollow structure morphology has attracted increasing attention. Its special surface structure, relatively larger specific surface area and good stability have more and more important application prospects in aspects of energy sources, catalysis, drug carriers, gas sensing and the like. At present, the synthesis methods of the hollow structure morphology mainly include template synthesis with a metal organic framework, acid etching, alkali etching, gas phase etching, high-temperature thermal decomposition, and the like methods. However, the preparation process using the above method is complicated, requires multi-step treatment, has high energy consumption, and is easy to pollute the environment.

SUMMARY

An objective of the present invention is to provide a method for preparing hollow octahedral cuprous oxide. This method has a low cost, low energy consumption, environmental friendliness, simple operation, and important academic significance and application values.

In order to realize the objective of the present invention, the present invention provides the following technical solutions.

The present invention provides a method for preparing hollow octahedral cuprous oxide, which includes the following steps:

(1) mixing a copper chloride solution and a sodium hydroxide solution, and then performing a precipitation reaction to obtain a precipitation solution; and (2) mixing the precipitation solution with glucose and ammonium hydroxide, and then reacting to generate the hollow octahedral cuprous oxide.

Preferably, the temperature of the precipitation reaction in the step (1) is 15-30° C.

Preferably, the concentration of the copper chloride solution in the step (1) is 20-25 g/L.

Preferably, the concentration of the sodium hydroxide solution in the step (1) is 0.5-1.5 mol/L.

Preferably, the volume ratio of the copper chloride solution to the sodium hydroxide solution in the step (1) is (25-35):(25-30).

Preferably, the temperature at which the precipitation solution is mixed with glucose and ammonium hydroxide in the step (2) is 15-30° C.

Preferably, the reaction in the step (2) is conducted at a temperature of 75-85° C. for a time of 1-5 h.

Preferably, the mass ratio of the glucose in the step (2) to copper chloride in the copper chloride solution in the step (1) is (0.1-0.3):(0.5-0.8).

Preferably, the mass concentration of ammonium hydroxide in the step (2) is 20-30%; and the volume ratio of the ammonium hydroxide to the copper chloride solution in the step (1) is (3-7):(25-35).

The present invention provides a method for preparing hollow octahedral cuprous oxide, which includes the following steps:

(1) mixing a copper chloride solution and a sodium hydroxide solution, and then performing a precipitation reaction to obtain a precipitation solution; and (2) mixing the precipitation solution with glucose and ammonium hydroxide, and then reacting to generate the hollow octahedral cuprous oxide.

In the present invention, firstly sodium hydroxide and copper chloride are reacted to generate a copper hydroxide precipitate; then glucose is used to reduce copper ions, and ammonium hydroxide is used to produce graded diffusion dissolution action on octahedral particles, such that the octahedral particles are gradually dissolved into hollow structures. It can be seen from the results of the examples that, the method provided by the present invention can prepare hollow octahedral cuprous oxide with an uniform and pure structure.

DESCRIPTION OF THE EMBODIMENTS

Figure 1:
FIG. 1 is an SEM image of hollow octahedral cuprous oxide of Example 1.

The present invention provides a method for preparing hollow octahedral cuprous oxide, which includes the following steps:

(1) mixing a copper chloride solution and a sodium hydroxide solution, and then performing a precipitation reaction to obtain a precipitation solution; and (2) mixing the precipitation solution with glucose and ammonium hydroxide, and then reacting to generate the hollow octahedral cuprous oxide.

In the present invention, a copper chloride solution and a sodium hydroxide solution are mixed, and then a precipitation reaction is performed to obtain a precipitation solution.

In the present invention, preferably copper chloride is dissolved in deionized water under stirring at room temperature, and then added with the sodium hydroxide solution to change the solution to be blue flocculent.

In the present invention, the concentration of the copper chloride solution is preferably 20-25 g/L, and more preferably 22-23 g/L.

In the present invention, the concentration of the sodium hydroxide solution is preferably 0.5-1.5 mol/L, and more preferably 1-1.2 mol/L.

In the present invention, the volume ratio of the copper chloride solution to the sodium hydroxide solution is preferably (25-35):(25-30), and more preferably 30:28.

In the present invention, the temperature of the precipitation reaction is preferably room temperature, specifically 15-30° C., and further 20-25° C.

In the present invention, after the precipitation solution is obtained, the precipitation solution is mixed with glucose and ammonium hydroxide and reacted to generate the hollow octahedral cuprous oxide.

In the present invention, after the precipitation solution is obtained, preferably the precipitation solution is added with glucose, then added with ammonium hydroxide after the dissolution of glucose, and finally the temperature is risen to the reaction temperature.

In the present invention, the temperature at which the precipitation solution is mixed with glucose and ammonium hydroxide in the step (2) is preferably room temperature, specifically 15-30° C., and further 20-25° C.

In the present invention, the reaction temperature in the step (2) is preferably 75-85° C., and more preferably 80-82° C.; and the reaction time is preferably 1-5 h, and more preferably 2-3 h.

In the present invention, the mass ratio of glucose in the step (2) to copper chloride in the copper chloride solution in the step (1) is preferably (0.1-0.3):(0.5-0.8), and more preferably 0.2:0.6-0.8.

In the present invention, the mass concentration of ammonium hydroxide in the step (2) is preferably 20-30%, and more preferably 25%; and the volume ratio of ammonium hydroxide to the copper chloride solution in the step (1) is preferably (3-7):(25-35), and more preferably 5:30.

In the present invention, the reaction is preferably carried out under a stirring condition; during the reaction process, glucose reduces copper ions at a high temperature, and ammonium hydroxide produces a graded diffusion dissolution action on the octahedral particles, such that the octahedral particles are gradually dissolved into hollow structures.

After the reaction is finished, a red precipitate is generated in the system. In the present invention, preferably the obtained product system is sequentially centrifuged, washed with water and washed with absolute ethanol to obtain a pure solid product, and then dried to obtain dry and pure hollow octahedral cuprous oxide. The present invention has no special requirement on the implementation of the centrifugation, the washing with water and the washing with anhydrous ethanol, and a method well known to those skilled in the art can be used. In the present invention, the drying temperature is preferably 60-80° C., and more preferably 65-75° C.; and the drying time is preferably 6-12 h, and more preferably 8-10 h.

The technical solution provided by the present invention will be described in detail in connection with the following embodiments, but they should not be construed as limiting the claimed scope of the present invention.

EXAMPLE 1

At room temperature (20° C.), 0.6819 g of copper chloride was dissolved in 30 mL of deionized water, then added with 28 mL of an aqueous sodium hydroxide solution (1 mol/L), mixed under stirring for 5 minutes, such that the solution turned blue to generate an intermediate product of copper hydroxide. It was added with 0.2 g of glucose and stirred thoroughly until dissolved, then added with 5 mL of ammonium hydroxide (with a mass fraction of 25%), and stirred continuously for 1 min. Then the reaction temperature was gradually risen to 80° C. The reaction was kept under stirring in water bath for 3 h, such that the solution gradually turned reddish brown to generate cuprous oxide. After the reaction was cooled to room temperature, the product was obtained by filtration and washing, and then subjected to baking treatment at 70° C. for 10 h to collect the hollow octahedral product.

Figure 2:
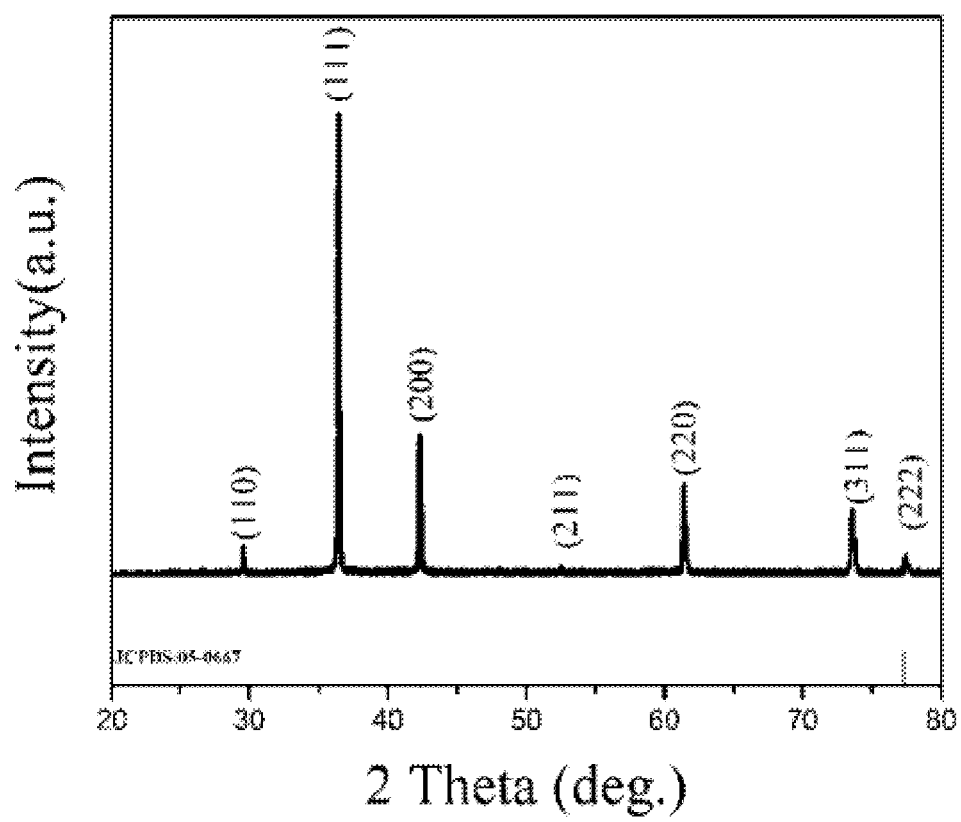
FIG. 2 is an XRD illustration of the hollow octahedral cuprous oxide of Example 1.

The product obtained in this example was detected for structure, and the results were as shown in FIGS. 1 and 2.

FIG. 1 was an SEM image of the hollow octahedral cuprous oxide, showing that the particle range of the hollow octahedral cuprous oxide was about 1.2-1.8 μm, and there was no formation of other particles having a disorderly morphology, exhibiting good uniformity.

FIG. 2 was an XRD illustration of the hollow octahedral cuprous oxide. The seven peaks of the obtained product corresponded to (110), (111), (200), (211), (220), (311) and (222) crystal faces of cuprous oxide respectively, and no other impurity peaks appeared. Therefore, the product was pure cuprous oxide.

EXAMPLE 2

At room temperature (25° C.), 0.7819 g of copper chloride was dissolved in 30 mL of deionized water, then added with 28 mL of an aqueous sodium hydroxide solution (1 mol/L), mixed under stirring for 5 minutes, such that the solution turned blue to generate an intermediate product of copper hydroxide. It was added with 0.2 g of glucose and stirred thoroughly until dissolved, then added with 5 mL of ammonium hydroxide (with a mass fraction of 25%), and stirred continuously for 1 min. Then the reaction temperature was gradually risen to 75° C. The reaction was kept under stirring in water bath for 3 h, such that the solution gradually turned reddish brown to generate cuprous oxide. After the reaction was cooled to room temperature, the product was obtained by filtration and washing, and then subjected to baking treatment at 70° C. for 10 h to collect the hollow octahedral product.

The product of this example was detected according to the method of Example 1. The results showed that the hollow octahedral cuprous oxide with a particle range of about 1.2-1.8 μm could be obtained in this example, and thus the structure uniformity was good. The seven peaks of the obtained product corresponded to (110), (111), (200), (211), (220), (311) and (222) crystal faces of cuprous oxide respectively, and no other impurity peaks appeared. Therefore, the product was pure cuprous oxide.

EXAMPLE 3

At room temperature (15° C.), 0.5819 g of copper chloride was dissolved in 30 mL of deionized water, then added with 28 mL of an aqueous sodium hydroxide solution (1 mol/L), mixed under stirring for 5 minutes, such that the solution turned blue to generate an intermediate product of copper hydroxide. It was added with 0.2 g of glucose and stirred thoroughly until dissolved, then added with 5 mL of ammonium hydroxide (with a mass fraction of 25%), and stirred continuously for 1 min. Then the reaction temperature was gradually risen to 85° C. The reaction was kept under stirring in water bath for 3 h, such that the solution gradually turned reddish brown to generate cuprous oxide. After the reaction was cooled to room temperature, the product was obtained by filtration and washing, and then subjected to baking treatment at 70° C. for 10 h to collect the hollow octahedral product.

The product of this example was detected according to the method of Example 1. The results showed that the hollow octahedral cuprous oxide with a particle range of about 1.2-1.8 μm could be obtained in this example, and thus the structure uniformity was good. The seven peaks of the obtained product corresponded to (110), (111), (200), (211), (220), (311) and (222) crystal faces of cuprous oxide respectively, and no other impurity peaks appeared. Therefore, the product was pure cuprous oxide.

The above description is only preferred embodiments of the present invention. It should be pointed out that, for those of ordinary skills in the art, several improvements and modifications can be made without departing from the principle of the present invention. These improvements and modifications should also be considered as falling into the claimed scope of the present invention.

What is claimed is:

1. A method for preparing hollow octahedral cuprous oxide, comprising the following steps:
   (1) mixing a copper chloride solution and a sodium hydroxide solution, and then performing a precipitation reaction to obtain a precipitation solution; and
   (2) mixing the precipitation solution with glucose and ammonium hydroxide, and then reacting to generate the hollow octahedral cuprous oxide;
   wherein the concentration of the copper chloride solution in the step (1) is 20-25 g/L
   wherein the concentration of the sodium hydroxide solution in the step (1) is 0.5-1.5 mol/L;
   wherein the volume ratio of the copper chloride solution to the sodium hydroxide solution in the step (1) is 30:28;
   wherein the mass ratio of the glucose in the step (2) to copper chloride in the copper chloride solution in the step (1) is (0.1-0.3):(0.5-0.8);
   wherein the mass concentration of ammonium hydroxide in the step (2) is 20-30%; and
   the volume ratio of the ammonium hydroxide to the copper chloride solution in the step (1) is (3-7):(25-35).

2. The preparation method according to claim 1, wherein the temperature of the precipitation reaction in the step (1) is 15-30° C.

3. The preparation method according to claim 1, wherein the temperature at which the precipitation solution is mixed with glucose and ammonium hydroxide in the step (2) is 15-30° C.

4. The preparation method according to claim 1, wherein in the step (2) the reaction is conducted at a temperature of 75-85° C. for a time of 1-5 h.

* * * * *